United States Patent [19]

Eugley

[11] 4,324,811

[45] Apr. 13, 1982

[54] DOUGH-LIKE PRODUCTS EXHIBITING REDUCED WATER ACTIVITY CONTAINING DERIVED PROTEIN-CONTAINING COMPOSITIONS

[75] Inventor: Susan L. Eugley, Harrison, N.Y.

[73] Assignee: Stauffer Chemical Company, Westport, Conn.

[21] Appl. No.: 219,561

[22] Filed: Dec. 23, 1980

Related U.S. Application Data

[63] Continuation-in-part of Ser. No. 141,019, Apr. 17, 1980, abandoned.

[51] Int. Cl.$^3$ ............................ A23C 21/08; A23J 3/00
[52] U.S. Cl. .................................. 426/656; 426/657; 426/661
[58] Field of Search ............... 426/549, 583, 656, 657, 426/661

[56] References Cited

U.S. PATENT DOCUMENTS

| | | | |
|---|---|---|---|
| 3,487,064 | 12/1969 | Swanson et al. | ............... 426/583 X |
| 3,718,484 | 2/1973 | Glabe . | |
| 3,833,413 | 9/1974 | Glabe et al. | ..................... 426/459 X |
| 3,906,114 | 9/1973 | Glabe et al. | ......................... 426/641 |
| 3,941,895 | 3/1976 | Ash et al. | ............................ 426/549 |
| 4,159,982 | 7/1979 | Hermansson | .................. 426/657 X |
| 4,163,069 | 7/1979 | Melachouris et al. | .......... 426/657 X |
| 4,202,909 | 5/1980 | Pederson | ......................... 426/583 X |

OTHER PUBLICATIONS

Murray, D. G. et al., "Low D.E. Corn Starch Hydrolysates", Food Technology, Mar. 1973, pp. 32–39.

*Primary Examiner*—Robert A. Yoncoskie
*Attorney, Agent, or Firm*—Paul J. Juettner

[57] ABSTRACT

Products of dough-like consistency exhibiting reduced water activity are disclosed comprising a mixture of a derived protein-containing composition and particularly a deproteinized mineral-containing whey by-product and starch at a moisture content of from about 20% to about 50% by weight. The products are effective as base materials for intermediate moisture foods.

13 Claims, No Drawings

DOUGH-LIKE PRODUCTS EXHIBITING REDUCED WATER ACTIVITY CONTAINING DERIVED PROTEIN-CONTAINING COMPOSITIONS

This application is a continuation-in-part of Ser. No. 141,019, filed Apr. 17, 1980, now abandoned.

BACKGROUND OF THE PRESENT INVENTION

This invention relates to products of dough-like consistency exhibiting reduced water activity containing derived protein-containing compositions and particularly byproducts obtained from concentrating whey protein by means of ultrafiltration or gel filtration.

It is well known that foods can be preserved by drying. It is also known that some foods having a moisture level between fresh and dried are stable and do not contain sufficient moisture to support bacteriological growth, i.e., cheese. Because of the recognition of this factor, a class of foods called "intermediate moisture foods" has arisen. One of the more important commercial examples of this class is semi-moist pet foods.

In order to determine if the semi-moist food will be stable, it is necessary to determine the water activity, $a_w$, of the product. Water activity is defined as the ratio of the materials' water vapor pressure to the vapor pressure of pure water at saturation in air at the temperature of the material.

This can be represented mathematically by the formula:

$$a_w = \frac{P_s}{P_o} = \frac{N_w}{N_w + N_s}$$

wherein the water activity is $a_w$, $P_s$ is the vapor pressure of water vapor in the food, $P_o$ is the vapor pressure of pure water at the same temperature, $N_w$ is moles of water and $N_s$ is moles of solute (Commercial Development of Intermediate Moisture and Food, M. Kaplow, Food Technology, Volume 28, page 889, August 1970).

One method of determining water activity involves humidifying samples in desiccators at 37° C. to the desired water activity by using reference saturated salt solutions. The procedure involves placing the sample uncovered in the desiccator and leaving the sample in the desiccator to equilibrate. Moisture isotherms are prepared by determining gravimetrically the weight increase of the samples. Illustrative reference saturated salt solutions are as follows:

TABLE I

| Salt | | $a_w$ at 25° C. | $a_w$ at 30° C. |
|---|---|---|---|
| Magnesium Chloride | MgCl$_2$ | 0.328 | 0.324 |
| Potassium Carbonate | K$_2$CO$_3$ | 0.432 | 0.432 |
| Magnesium Nitrate | MgNO$_3$ | 0.529 | 0.514 |
| Sodium Bromide | NaBr | 0.576 | 0.560 |
| Cobalt Chloride | CoCl$_2$ | 0.649 | 0.618 |
| Strontium Chloride | SrCl$_2$ | 0.709 | 0.691 |
| Sodium Nitrate | NaNO$_3$ | 0.743 | 0.731 |
| Sodium Chloride | NaCl | 0.753 | 0.751 |
| Potassium Bromide | KBr | 0.809 | 0.803 |
| Ammonium Sulfate | (NO$_4$)$_2$SO$_4$ | 0.810 | 0.806 |
| Potassium Chloride | KCl | 0.843 | 0.836 |
| Strontium Nitrate | Sr(NO$_3$)$_2$ | 0.851 | |
| Barium Chloride | BaCl$_2$ | 0.902 | |
| Potassium Nitrate | KNO$_3$ | 0.936 | 0.923 |
| Potassium Sulfate | K$_2$SO$_4$ | 0.973 | 0.970 |

It has been reported that typical intermediate moisture foods have water contents of from 15% to 30% on a dry solids basis and water activities lower than 0.85. Fresh foods generally have more than 60% moisture and an $a_w$ of greater than 0.90. Dry foods have a moisture content of less than 15% and an $a_w$ of less than 0.20.

Three problems are connected with the stability of intermediate moisture foods, i.e., microorganisms, browning and lipid oxidation. Depressing the water activity has an inhibiting effect on the growth of microorganisms and, apparently, an antioxidant effect on lipid oxidation.

Stille (1948) has suggested an $a_w$ of 0.75 as an overall limit for most foods stored in cool environments. Mossel and Ingram (1955) have suggested an $a_w$ of 0.70 for long term storage in tropical climates. Mossel and Sand (1968) suggest inhibition of all microorganisms occurs only below $a_w$ of 0.60. It is noted that these are guidelines. Moisture isotherms shift with temperatures such that storage at a higher temperature with the same moisture content gives a higher $a_w$ than storage of the same product at lower temperature.

Water activity below which microorganism growth if inhibited is illustrated by the following though these amounts can vary:

TABLE II

| Organism | Water Activity $a_w$ |
|---|---|
| Bacteria | 0.91 |
| Yeasts | 0.88 |
| Molds | 0.80 |

(NASA CONTRACTOR REPORT, NASA CR 114,861, June 1972, Table 1, page 77).

Because the stability is dependent on available moisture and not total moisture, much research has been done in the area of humectants. In descending order of effectiveness as humectants are sodium chloride, potassium chloride, propylene glycol, glycerol 1-3-butylene glycol, sorbitol, fructose, polyethylene glycol 400, glucose, sucrose, 42 D.E. corn syrup solids and lactose. It has also been suggested that dried whey, delactosed whey and whey protein concentrate may find utility as humectants. While sodium and potassium chloride are 2-2.5 times more effective than propylene glycol, they have not been used for humectants due to flavor problems. While propylene glycol and glycerol are highly effective as humectants, they are detectable by pets who dislike the taste. Compositions which provide effective water activity and good taste are needed to overcome the problems incurred in using prior art materials in preparing intermediate moisture foods.

It is also known that, because of the increasing requirement for protein sources throughout the world, various processes have been recently developed to extract protein from whey. Particular reference is made to the Dienst Attebery patent, U.S. Pat. No. Re. 27,806, which discloses a method of separating protein from cheese whey by means of molecular sieve resin, more commonly known as gel filtration. Also in active use is the technique of ultrafiltration to separate and concentrate the protein from the whey. The development of the separation techniques has also raised further processing problems. The byproducts from these processes are not easily adaptable to present known techniques of material handling.

In the processing of cheese whey by molecular sieve resin, a low molecular weight fraction (about 5-10% solids) is obtained which has a solids composition of mainly lactose and minerals with residual protein. The solids in this low molecular weight fraction can be described more particularly by the following typical chemical analysis.

| | |
|---|---|
| Lactose, % | 40–50 |
| Minerals, % | 25–35 |
| Protein (N × 6.38), % | 15–20 |
| Lactic Acid, % | 7–10 |
| Citric Acid, % | 3–6 |
| Fat, % | less than 1 |
| Moisture | less than 5 |
| pH | 6.6–7.2 |

Similarly, the use of ultrafiltration provides a permeate which is high in minerals and lactose. The solids in the permeate can be described more particularly by the following typical chemical analysis.

| | |
|---|---|
| Lactose, % | 70–80 |
| Minerals, % | 10–15 |
| Protein, (N × 6.38), % | 4–8 |
| Fat, % | less than 1 |
| Moisture | less than 5 |
| pH | 6–7 |

After removing the lactose by normal lactose crystallization procedures, the now delactosed permeate contains from about 40% to about 45% lactose, from about 25% to about 35% ash and from about 8% to about 12% protein (TKN×6.38). However, the total Kjeldahl nitrogen (TKN) is a measure of all the nitrogen in the system (protein as well as non-protein nitrogen), and this is an approximation of the total protein present. While the delactosed permeate is indicated to have 8–12% protein (TKN×6.38), more than 60% of this protein is based on non-protein nitrogen, i.e., derived protein and amino acids. Derived protein is defined as a decomposition product of proteins that is intermediate in complexity of structure between proteins and amino acids (Hackh's Chemical Dictionary, 3rd Edition).

Two primary problems have been associated with the low molecular weight fraction and the permeate. First of all, conventional drying techniques cannot be utilized due to undesirable particle adherence to the walls. The second problem associated with these products is the undesirably high level of hygroscopicity exhibited by these products. The products, particularly delactosed permeate, rapidly pick up moisture from the air. Also, the undesirable level of hygroscopicity tends to detract from the potential use of this product in food applications. Once the package is opened, the dried particles immediately absorb moisture and cake.

It is also known to utilize the permeate and delactosed permeate in the formation of an egg albumen extender. In assignee's copending application Ser. No. 970,688, now U.S. Pat. No. 4,238,519, issued Dec. 9, 1980, the disclosure of which is incorporated herein by reference, there are disclosed egg albumen extenders comprising at least 65% by weight on a dry solids basis of a derived protein-containing composition from plant or animal sources wherein said derived protein-containing composition has a molecular weight of less than 20,000, a total Kjeldahl nitrogen content of from about 0.45% to about 2.1% of which at least 60% of the nitrogen is non-protein nitrogen, and from 0% to about 30% of a whipping aid, in combination with a member selected from the group consisting of gelatin, gelatin and a water soluble polyphosphate, a gum, and mixtures thereof. It has been found that these products are also difficult to dry when prepared from the liquid byproduct solution. Dry blending cannot be accomplished due to the difficulties in drying the byproduct solution before blending.

An improved process for drying a mineral containing aqueous protein solution is disclosed in U.S. Pat. No. 3,840,996. In this patent, the low molecular weight byproduct fraction from the gel filtration of the whey is admixed with inorganic drying agents selected from the group consisting of tricalcium phosphate, dicalcium phosphate, kaolin, diatomaceous earth, silica ggel, calcium silicate hydrate, or mixtures thereof and spray dried. This product is useful in flavor-enhancing various foods.

In assignee's copending application Ser. No. 6,817, it is disclosed that mineral containing deproteinized whey byproduct solutions can be more effectively dried by mixing from about 5% to about 50% casein or alkali metal caseinates with the solution and codrying the solution. However, the high cost of casein and caseinates make this process economically unattractive.

It has now been found that dough-like products exhibiting reduced water activity and good flavor for preparing intermediate moisture foods can be obtained containing derived protein-containing compositions and particularly deproteinized mineral-containing whey byproducts of whey protein concentrate.

BRIEF SUMMARY OF THE INVENTION

In accordance with the present invention, it has been found that a product exhibiting reduced water activity comprising a blend of a first composition which comprises at least 65% of a derived-protein containing composition from plant or animal sources wherein the molecular weight of said derived protein-containing composition is less than 30,000, and preferably less than 20,000, said composition having a total Kjeldahl nitrogen content of from about 0.45% to about 2.1% of which at least 60% of the nitrogen is non-protein-nitrogen, from about 0% to 35% of a member selected from the group consisting of from about 1% to about 15% gelatin; from about 1% to about 15% gelatin and from about 5% to about 25% of a water soluble polyphosphate, the additive total of gelatin and phosphate not to exceed about 35%; from about 0.5% to about 5% of a gum; and mixtures thereof; and from about 0% to about 30% of a whipping aid, all percentages being by weight based on the total dry solids weight of the aforecited ingredients in said first composition and from about 20% to about 75% of a starch as defined hereinafter at a moisture content of from about 20% to about 50% and preferably from about 25% to about 35% by weight based on the total weight of the blend and moisture forms a product with a dough-like consistency which retains its moisture content and does not immediately dry when exposed to air. The dough is pliable and moldable. The dough can be formed into hard shapes by molding and drying which dough-like consistency can be recovered upon rehydration. The products of the invention are characterized by providing a water activity within the range of from about 0.5 to about 0.8 and preferably 0.55 to 0.75 at 30% moisture at 37° C. This product is useful as a base for foods. The water activity of the dough is such that microbiological growth is not favored so that the dough can be used in preparing intermediate moisture foods. The products of the invention are bland to slightly salty and thus contribute no flavor problems when used in foods even in large amounts.

The amounts of starch are based on the dry solids in the final dried product.

DETAILED DESCRIPTION OF THE PRESENT INVENTION

The dough-like products of the present invention are based on certain derived protein-containing compositions. The molecular weight for substantially all matter in the derived protein-containing composition is less than 30,000 and preferably less than 20,000. A material which has been ultrafiltered through a membrane having a molecular cut-off of 20,000 is considered less than 20,000.

As used herein, the term "derived protein containing composition" is intended to include all protein decomposition products including peptides and amino acids.

The nitrogen in the derived protein-containing composition is determined by the Kjeldahl method which determines nitrogen from all sources, and cannot differentiate between protein nitrogen and non-protein nitrogen. In the present invention, the total Kjeldahl nitrogen (TKN) content in the derived protein-containing composition preferably ranges from about 0.45% to about 2.1% and more preferably from about 1.1% to about 2.1% providing a total Kjeldahl protein content of from about 3% to about 13% and from about 7% to about 13% respectively. Of the total Kjeldahl nitrogen at least about 60% is non-protein nitrogen. Non-protein nitrogen is determined by adding trichloroacetic acid to a protein solution in an amount sufficient to provide about a 15% solution of trichloroacetic acid. Protein is precipitated and removed by centrifugation. The nitrogen content of the supernatant is determined by the Kjeldahl nitrogen method. The percent total non-protein nitrogen is determined by dividing the trichloroacetic acid soluble Kjeldahl nitrogen by the total Kjeldahl nitrogen content of the original solution on a dry solids basis. The non-protein nitrogen can range as high as 2.1% (all non-protein nitrogen) and preferably from about 0.66% to about 1.68%.

The percentage of Kjeldahl nitrogen and non-protein nitrogen is based on a dry solids basis of the weight of the derived product containing composition. Further discussion can be found in Ser. No. 970,688, ibid.

The derived protein-containing composition can be prepared from legumes, oil bearing seeds, milk or milk derived products. The derived protein-containing compositions are usually byproducts of a previous procedure used to extract an ingredient from the main source.

The legumes include any members of the pea family such as peas, soy beans and peanuts and preferably soy beans. The oil bearing material seeds include those materials from which oil is extracted such as cottonseed, safflowers, corn and the like.

The derived protein-containing compositions used in the present invention are prepared, for instance, by precipitating protein from an aqueous solution in a manner similar to cheese or soy protein isolate production. When preparing soy protein isolate, soy protein is extracted from defatted soy flour and is separated from the solution by acidifying to pH of approximately 4.6. The precipitated product is called soy protein isolate and the supernatant is termed soy whey. In the countries of the Far East, a similar product is prepared by precipitating a curd or tofu from soy milk leaving a similar soy whey. These soy wheys can be further processed to remove the higher molecular weight protein and provide a product usable in the present invention. Other such by-products can be prepared from other legume or oil bearing seeds.

The derived protein-containing composition is preferably obtained from a dairy source, i.e., milk and milk derived products. The derived protein-containing composition prepared from a dairy source is generally the byproduct of a physical or chemical separation or fractionation of the various components in the milk or milk derived product. Such physical or chemical processes include gel permeation filtration, ultrafiltration, dialysis, electrodialysis, as well as protein precipitation processes such as cheese production, either enzyme or acid, chemical precipitation including acid addition for casein precipitation, polyphosphate, sodium lauryl sulfate or other such chemical protein precipitations.

Preferably, the derived protein-containing composition is prepared from soy or dairy whey and more preferably dairy whey which has been processed to further reduce the protein constituent therein. For instance, whey can be filtered through an ultrafiltration membrane to provide a protein rich retentate and a deproteinized mineral-containing lactose rich permeate.

The dried products of the present invention are preferably based on certain deproteinized whey byproduct solutions. As used herein, the term "whey byproducts" is intended to encompass the low molecular weight second fraction obtained from the molecular sieve fractionation of whey as described in U.S. Pat. No. Re. 27,806, the permeate obtained from the ultrafiltration concentration of protein from whey, and delactosed permeate.

The low molecular weight second fraction is the material obtained by passing a partially delactosed cheese whey mother liquor through a bed of molecular sieve resin in accordance with Reissue Patent No. 27,806 and recovering, for the purposes of this invention, the low molecular weight second fraction containing mainly lactose, minerals and residual protein. The molecular weight cut-off of the gel is preferably 30,000. The partially delactosed whey mother liquor is obtained by concentrating raw cheese whey by conventional means to a solids concentration of about 60%, reducing the temperature of the concentrate to induce lactose crystallization and thereafter separating crystalline lactose from the liquid by conventional means.

If desired, the whey can be pretreated to clarify the whey using processes such as illustrated by that disclosed in U.S. Pat. No. 3,560,291. In accordance with this patent, lipid is removed as a precipitate from whey by treating the whey solution with a calcium ion at approximately a neutral pH.

Preferably, the whey stream used in the gel filtration fractionation of whey is clarified prior to delactosing. The preferred method of clarification is the process described in U.S. Pat. No. 3,560,219 for sweet whey. For acid whey, the preferred clarification method is that shown in U.S. Pat. No. 4,036,999, the disclosure of which is incorporated herein by reference.

Also effective in the present invention is the permeate obtained from the ultrafiltration of cheese whey solutions. Ultrafiltration membranes are utilized to separate the high molecular weight protein and non-protein nitrogen compounds (below about 20,000 molecular weight); and ash in the whey solution. The protein enriched solution is retained on the membrane and it is called the retentate. The water and low molecular weight fraction passes through the membrane and is called the permeate. An illustrative method for ultrafiltration is described by Horton, B. S. et al., Food Technology, Vol. 26, page 30, 1972.

In an illustrative method for ultrafiltering cheese whey, an acid or cottage cheese whey concentrate containing from about 40% to about 60% and preferably 50%-55% whey protein is prepared by neutralizing acid whey to a pH of 6.5 with caustic. After storage, the pH is then adjusted to 7.2 and any solids or precipitates are removed by centrifugal clarification. The clarified liquor is then pasteurized and fed into the ultrafiltration membrane unit. The retentate is condensed and spray dried. The liquid permeate is then used in the process of the present invention.

The permeate can be dried as is or concentrated and/or delactosed by concentration and cooling to effect a precipitation of a lactose. The permeate is a deproteinized whey solution and the delactosed permeate is a delactosed deproteinized whey solution.

The raw cheese whey source used in preparing the materials used in the present invention can be acid cheese whey, sweet cheese whey, or mixtures thereof. More particularly, the raw cheese whey can be cottage cheese whey, casein cheese whey, cheddar cheese whey, mozarella cheese whey, Swiss cheese whey or mixtures thereof. Preferably, raw cheese whey used in connection with the molecular sieve fractionation is a blend of cottage cheese whey and cheddar cheese whey. The preferred cheese whey for use in the ultrafiltration fractionation of whey is acid cheese whey.

The remaining disclosure will be directed to the preferred species deproteinized mineral-containing whey byproducts. However, it is understood that this discussion applies equally to the broad generic concept of the invention.

The starch, used in the present invention, can be any starch or blends thereof, modified or unmodified which is water-soluble (swellable). The starch is defined as that which will provide a viscosity above 1000 cps and less than 200,000 in a 10% solution at 25° C. as measured on a Brookfield Model LVT Viscometer with a No. 3 spindle at 0.6 RPM. Preferably, the starch provides a viscosity within the range of from about 80,000 and about 120,000 cps and more preferably 90,000 to about 100,000.

The starch can be derived from any starch source such as cereal grains, i.e., corn, waxy corn, wheat, sorghum, rice; tubers, or roots of such plants as cassava (tapioca), potato or arrowroot and the pith from the sago palm.

The starch can be modified or non-modified. Modification includes genetic modification (waxy corn or waxy sorghum), starch conversion, crosslinking, derivation, and physical treatment. The starch can be from any source and treated using any method of modification or combination thereof which provides the desired viscosity range.

The maintenance of a maximum viscosity of starch without a substantial reduction in viscosity over an extended cook time is accomplished by cross-linking. Cross-linking is generally used in starches used for thickening and stabilizing. The starch granules are treated with di- or polyfunctional reagents capable of reacting with the hydroxyl groups in the starch molecule such as mixed anhydride of acetic and citric acid or adipic acid, meta phosphates, phosphorus oxychloride, epichlorohydrin and the like. Only a few crosslinks are necessary to toughen the starch granules.

Derivation includes reacting the hydroxyl groups of the starch with various chemical agents to change the characteristics of the starch. Physical treatment includes redrying, blending with additives such as tricalcium phosphate as a flow control agent, precooking (pregelatinized starch), drum dried ground flakes (water soluble) and spray dried cooked starches.

The type of starch utilized depends on the physical and chemical characteristics of the starch, the amount used, and the end use of the product. The preferred starch is a high viscosity, precooked, modified starch designed for instant dessert applications such as H-50A of National Starch and Chemical Corp.

Thin-boiling starches made by controlled acid hydrolysis of starch in the granular state at about 52° C. using sulfuric or hydrochloric acid as catalyst are less preferred since the use of these starches forms sticky dough.

The dough containing the whey byproduct solution and the starch can be prepared alone or with flavors, colors, emulsifying agents, stabilizers and the like which can also be dissolved in the solution of the whey byproducts and the starch. Other proteins (up to 25%) such as dairy proteins including whey, delactosed whey, whey protein concentrates, whey precipitates prepared by the processes of U.S. Pat. Nos. 3,560,219 and 4,036,999 and the like or vegetable proteins such as soy can also be added though this is not preferred. Also, functional ingredients in amounts ranging from about 0% to about 35% and preferably from about 0.5% to about 35% can be added in forming a final product with specific functionality. For instance, from about 1% to about 15% gelatin; or from about 1% to about 15% gelatin and from about 5% to about 25% of a water soluble polyphosphate such as sodium hexametaphosphate, the additive total of gelatin and polyphosphate not to exceed about 35%; or from about 0.5% to about 5% of a gum; or mixtures thereof can be included in the dough. The percentages are based on the weight of the solids of the raw whey byproduct exclusive of the starch.

The gelatin used in the present invention can be either of the alkaline or preferably the acid prepared type. Gelatins ranging in Bloom strength from about 100 to about 300 and preferably from about 200 to about 250 Bloom can be used. The gelatin can be predissolved in water to facilitate incorporation. Preferably, ∓cold-water dispersible" gelatin is used.

The water soluble polyphosphate usable in the present invention are medium chain length sequestering type polyphosphate of the formula:

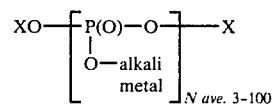

wherein X is hydrogen or alkali metal. Preferably, the average chain length (N ave.) is from 3 to 20. Representative compositions within this group are sodium or potassium tripolyphosphate, sodium or potassium tetrapolyphosphate, sodium or potassium hexametaphosphate, the more preferred being sodium hexametaphosphate (SHMP) with an average chain length of 6-18, and the most preferred 9-12.

The gums which can be used in the present invention include any of the edible gums or protective colloids such as carrageenan, alginates including sodium or potassium alginate, cellulose gums including sodium carboxymethylcellulose, methyl cellulose, hydroxymethylcellulose, hydroxyethylcellulose, hydroxypropylcellulose, hydroxymethylpropylcellulose and preferably, carboxymethylcellulose, acacia, guar, xanthan, and mixtures thereof.

The gum is preferably used in an amount ranging from about 0.5% to an amount above which the final product shows adverse properties in the area of use. In general, the gum is not to exceed about 5% by weight based on the weight of the final product (exclusive of starch), the upper limit varying depending on the actual gum utilized. In some cases, more can be used and in some cases, less. The preferred gum is carrageenan which is used in amounts ranging from 0.5% up to and including about 3% (exclusive of starch).

The optional whipping aid is illustrated by enzyme hydrolyzed wheat or soy protein which can be prepared by hydrolyzing any wheat or soy protein or wheat protein mixture such as gluten by any proteolytic enzyme effective for that purpose provided the final product has a bland flavor which will not affect the overall flavor of the egg albumen replacer. Proteolytic enzymes are well known to those skilled in the art and effective proteolytic enzymes can be easily determined by such person. While the enzymatically hydrolyzed wheat or soy protein can be used alone, it is preferably used with a small quantity (up to and including about 20%) to thicken and stabilize the mixture, the percentage being by weight based on the total weight of the enzyme hydrolyzed wheat protein. An illustration of these materials is HYFOAMA 68 available from Naarden Lenderrink and Co., Belgium and GUNTHERS 400V available from A. E. Staley.

The former material has 60% protein, 5% water, 6% ash, and 20% carbohydrate. The enzymatically hydrolyzed wheat protein is used in amounts of from about 5% to about 30% and preferably from about 10% to about 20% by weight based on the total weight of the whey byproduct containing composition exclusive of starch. The latter material is composed of enzymatically modified soy protein (55% of total), sodium hexametaphosphate, gelatin and sodium aluminum sulfate.

The amount of starch used is dependent on the chemical characteristics of the starch. In general, the starch is used in an amount ranging from about 20%, preferably from about 20% to about 75% and more preferably from about 25% to about 50%, said percentages being based on the dry weight of the protein component and optional gelatin, polyphosphate, gum and whipping aid. These amounts are for the preferred high viscosity, precooked, modified instant dessert starches and may vary from starch to starch.

The dough can be provided by any means adapted to effect the preparation of a dough with a moisture content within the ranges to be discussed hereinafter. Dried ingredients can be rehydrated with moisture specifically added or absorbed from the atmosphere. The dry powder can include some or all of the ingredients and can be prepared by drying each ingredient and blending using known techniques or codrying some or all of the ingredients. Ingredients can be partially dried and if desired blended with other dry ingredients to provide the proper moisture level. As illustrative, liquid delactosed permeate can be concentrated by such standard means as a falling film evaporator. Dry ingredients such as gelatin and SHMP can be added. Concentration of the liquid delactosed permeate can be undertaken to a point which, when combined with the solid ingredients, provides the final desired moisture content. Some moisture, up to 15%, can be lost on mixing. Preferably, the dough is prepared wholly or partially from liquid ingredients such as liquid delactosed permeate to avoid an expensive drying step.

It is important that the moisture content of the dough be maintained between about 20% and about 50% and preferably from about 25% to about 35% by weight based on the total weight of the dough of the byproduct composition and the moisture.

It has been found that the dough-like product with or without the gelatin, SHMP, or gum when incorporated in a food product can perform the function of a humectant. Thus, the product of the invention can be used in areas where humectants such as propylene glycol are presently in use. The products of the invention can be used as the sole humectant or in combination with other known humectants. Effective humectant activity can be established using a sufficient amount of the humectant to provide from about 2% to about 20% by weight derived protein in said food on a dry solids basis.

The dough-like product of the invention can be used in food products as flavor enhancing agents, flavor agents or binding agents. More specifically, the dough-like products of the invention can be used in meat products, for example, soups, stews, gravies, breadings, batters, beef patties and imitation sausages. Also, the product can be used in chip dips, cheese products such as cheese spreads, process cheese foods, spray dried cheeses, and imitations thereof and the like. The dough can also be used in non-food areas such as cosmetics and moldable dough for playing.

Of particular importance is the use of the products of the present invention as a base and humectant in intermediate moisture foods such as semi-dry pet foods. The semi-dry pet food can be prepared by blending the food ingredients with the liquid whey byproduct and starch at a moisture content sufficient to provide a dough. Also, the whey byproduct/starch blend can be dried and added to the ingredients of the food under such conditions that the blend is rehydrated to the desired level. The dough, because of its bland taste, is compatible with most ingredients of a food product. The products of the invention can be used as the sole base and/or humectant or in combination with other known base materials and/or humectants. The products can be incorporated in place of existing humectants in standard recipes. The products of the invention are preferably used in such amounts as to provide a water activity for the food of between about 0.5 and about 0.8 when measured at 30% moisture at 37° C.

The present invention is further illustrated in the examples which follow. The starch as used herein as identified as a pudding grade starch, H-50A from National Starch and Chemical Corp., is a finely ground, high viscosity (about 90,000–95,000 cps in a 10% solution at 25° C.) precooked modified starch primarily designed for instant dessert applications.

EXAMPLE 1

11 grams of SHMP, 2.3 grams gelatin and 66.7 grams of a pudding grade starch (H-50A, National Starch and Chemical Corp.) are dry blended. The dry blend is blended slowly into 140 grams delactosed permeate (31% to 34% TS). The dough is kneaded until the dry ingredients are well dispersed. Sample is then placed in a laboratory vacuum oven set at 54.4° C. and 63.5 centimeters of mercury vacuum. The rate of moisture loss is shown in Table I below:

TABLE I

| TIME (Hours) | | SAMPLE WEIGHT (GRAMS) | % LOSS | % TOTAL SOLIDS |
|---|---|---|---|---|
| 0 | | 105.5 | 0 | 56.15 |
| 1 | | 101.8 | 3.7 | 58.19 |
| 2 | | 92.6 | 9.2 | 63.97 |
| 2.5 | | 89.2 | 3.4 | 66.41 |
| 9.0 | Room Temp. | 86.9 | 2.3 | 68.17 |
| 7.2 | Ambient Hum. | 77.3 | 9.6 | 76.63 |

EXAMPLE 2

A similar sample prepared in accordance with the procedure of Example 1 and oven tested at 65.5° C. and 73.66 centimeters of mercury vacuum provides the following results:

TABLE II

| TIME (HOURS) | SAMPLE WEIGHT (GRAMS) | % LOSS | % TOTAL SOLIDS |
|---|---|---|---|
| 0 | 118.1 | 00 | 56.15 |
| 1 | 105.8 | 12.3 | 62.66 |
| 2 | 96.3 | 9.5 | 68.86 |
| 3 | 90.8 | 5.5 | 73.03 |
| 4 | 87.0 | 3.8 | 76.22 |
| 5 | 84.3 | 2.7 | 78.66 |
| 6 | 82.7 | 1.6 | 80.19 |

EXAMPLE 3

300 milliliters of delactosed permeate is evaporated to 40° Brix+ using a rotating flask vacuum evaporator set at 62° C., 63.5 centimeters mercury and a Varispeed ™ setting at 100 for 3 hours. 5.5 grams sodium hexametaphosphate, 1.1 grams gelatin and 33.3 grams pudding type starch (H-50A, National Starch and Chemical Corp.) are dry blended and added to 43 grams of concentrated DLP. Small dough balls are formed when the ingredients are mixed by hand with a spatula.

EXAMPLE 4

Delactosed permeate from the ultrafiltration concentration of whey is concentrated to 47% solids on a falling film evaporator. 1.3 liters of this concentrated DLP is added to a stainless steel container and heated to 60° C. in a water bath. 7 milliliters of catalase is added to destroy any residual hydrogen peroxide which may be present from a preservation system. 0.804 grams of OROLINE yellow dye is then dissolved in the DLP. 42.25 grams of gelatin is also dissolved into the hot DLP. The DLP/gelatin/dye mixture is added to a Hobart ™ Mixing Bowl using a paddle and low speed. Incrementally blended into said liquid is a dry mix of 663 grams of pudding starch (H-50A National Starch and Chemical Corp.) and 189 grams of sodium hexametaphosphate. The dried powder is added slowly over a period of about 50 minutes. Upon completion of the powder addition, the mixing paddle is detached and a dough hook is attached and mixing continued. Mixing is stopped approximately 1 hour and 20 minutes after mixing was initially started. The product is an orange dough-like mass of approximately 1.9 kilograms having a total solids within the range of 71-75%.

Samples show no growth when exposed to air for one week and in some cases, a reduction in growth.

EXAMPLE 5

100 grams of pudding type starch (H-50A, National Starch and Chemical Corp.) is blended with 429 grams of liquid DLP having 35% solids at a ratio of about 1:1.5 on a solids basis. The blend is pasty and viscous and is freeze-dried. After milling, the freeze-dried blend is a fine powder. The freeze-dried powder is placed inside a humid chamber at 75% relative humidity at 37° C. which is equilibrated with a saturated NaCl solution. After reaching equilibrium (about three days), a dough of a moisture content of about 30% is formed. The time period for forming the dough can be shortened by the use of a higher relative humidity in the chamber. The dough remains moist and unspoiled in a moist air environment for several months.

In comparison to the dough formed in Example 4, the consistency of the dough of the present example is softer and more pliable. The doughs made by both examples are cohesive and non-sticking.

A dough made with starch and water (30% moisture) without DLP cannot maintain a soft dough-like consistency and becomes hard after a short period of storage even under humid conditions (75% relative humidity).

Samples from the preceding examples showed no microbiological growth when exposed to air for one week and in some cases a reduction in growth is shown.

EXAMPLE 6

Three intermediate moisture pet foods are prepared to show the effectiveness of the products of the invention as humectants. The formulation used is as follows:

TABLE II

| INGREDIENT | % |
|---|---|
| Chicken Junior Baby Food | 30.1 |
| Dextrose | 28.6 |
| Soy Flour | 27.6 |
| Water | 4.8 |
| Fat | 2.4 |
| Emulsifier (Mono and di-glycerides-Atmul 80) | 1.0 |
| Potassium Sorbate | 0.5 |
| Sample A-Propylene Glycol (Control) | 5.0 |
| Sample B-Liquid DLP | 4.8 |
| Sample C-DLP/Starch (Tapioca Dextrin)-2:1 ratio | 2.9 |

The baby food, a retorted blend of chicken, chicken broth and cooked chicken and the water is weighed into a stainless steel mixing bowl. The mixture is heated to 70° C. The emulsifier, fat, potassium sorbate and the liquid DLP or the propylene glycol are then added. Heating is continued until the ingredients are dissolved. The dextrose and soy flour and, if present, the DLP/Starch product are dry blended and the liquid system is then added to the dry system. The resultant blend is kneaded into dough and shaped into pellets having a diameter of 1.9 centimeters and a height of 1.27 centimeters. The pellets are stored in water impermeable containers.

The water activity of the Samples is determined with the following results:

| SAMPLE | WATER ACTIVITY | % MOISTURE |
| --- | --- | --- |
| A (Control) | 0.80 | 29.3% |
| B (L. DLP) | 0.83 | 27.1% |
| C (DLP/Starch) | 0.825 | 24.7% |

EXAMPLE 7

Three dough-like products were prepared, the first in accordance with the invention and the second and third using propylene glycol and glycerol respectively as humectants. The doughs were prepared by dissolving 1.7 grams of gelatin and 8 grams SHMP in 30 grams of water. The water was heated to 50° C. to dissolve the gelatin after which the solution was cooled to 25° C. 32.3 grams of DLP or propylene glycol or glycerol were mixed with the gelatin/SHMP solution. 28 grams of pudding starch (H-50A) was added slowly to the gelatin/SHMP solution blending to a smooth consistency. The resultant dough was kneaded 15 minutes to evenly disperse all ingredients. The following results were obtained:

| SAMPLE | WATER ACTIVITY | PHYSICAL PROPERTIES |
| --- | --- | --- |
| DLP | Aw = .69 | Firm, pliable, dry to the touch |
| Propylene Glycol | Aw = .55 | Very soft, very sticky |
| Glycerol | Aw = .51 | Very wet, not sticky |

While propylene glycol and glycerol will form a dough, the handling properties are quite different from a DLP-based dough. The DLP-based dough is firm, pliable and dry to the touch and more similar to a cheese analog product than the other two.

What is claimed is:

1. A product of dough-like consistency exhibiting reduced water activity comprising a blend of a first composition which comprises at least 65% of a low molecular weight protein-containing material derived from plant or animal sources wherein the molecular weight of said protein-containing material is less than 30,000, said material having a total Kjeldahl nitrogen content of from about 0.45% to about 2.1% of which at least 60% of the nitrogen is non-protein nitrogen, from about 0% to about 35% of a member selected from the group consisting of from about 1% to about 15% gelatin, from about 1% to 15% gelatin and from about 5% to about 25% water-soluble polyphosphate, the additive total of gelatin and phosphate not to exceed about 35%, from about 0.5% to about 5% of a gum, and mixtures thereof; and from about 0% to about 30% of a whipping aid, all percentages unless otherwise stated being by weight based on the total dry solids weight of the aforecited ingredients in said first composition, and from about 20% to about 75% by weight based on the dry weight of said blend of a starch having a viscosity within the range of from about 1,000 cps to about 200,000 cps in a 10% solution at 25° C. said product having a moisture content ranging from about 20% to about 50% by weight based on the total weight of said product of dough-like consistency.

2. The product as recited in claim 1 wherein said protein-containing material is selected from the group consisting of the low molecular weight fraction obtained by the gel fractionation of whey, the permeate resulting from the ultrafiltration concentration of whey and the delactosed permeate resulting from delactosing the said permeate.

3. The product as recited in claim 2 wherein said protein-containing material is the permeate resulting from the ultrafiltration of whey.

4. The product as recited in claim 3 wherein said permeate is delactosed.

5. The product as recited in claim 1 wherein said starch has a viscosity within the range of from about 80,000 cps to about 120,000 cps.

6. The product as recited in claim 1 wherein the starch has a viscosity within the range of from about 90,000 cps and about 100,000 cps.

7. The product as recited in claim 1 which comprises at least 0.5% of said member.

8. The product as recited in claim 7 wherein said member is gelatin and polyphosphate.

9. The product as recited in claim 8 wherein said gelatin is used within the range of from about 3% to about 5% and said polyphosphate is used within the range of from about 18% to about 20%.

10. The product as recited in claim 8 wherein said polyphosphate is sodium hexametaphosphate.

11. The product as recited in claim 9 wherein said protein-containing material is the delactosed permeate resulting from the ultrafiltration of whey.

12. The product as recited in claim 11 wherein said starch is present in an amount ranging from about 25% to about 50%.

13. The product as recited in claim 1 which has a water activity ranging from about 0.5 to about 0.8.

* * * * *